Jan. 16, 1968  H. A. LEFLET, JR., ETAL  3,364,005
APPARATUS FOR BENDING GLASS SHEETS
Filed June 25, 1958  4 Sheets-Sheet 1

INVENTORS
Herbert A. Leflet, Jr. and
Frank J. Carson
Nobbe & Swope
ATTORNEYS

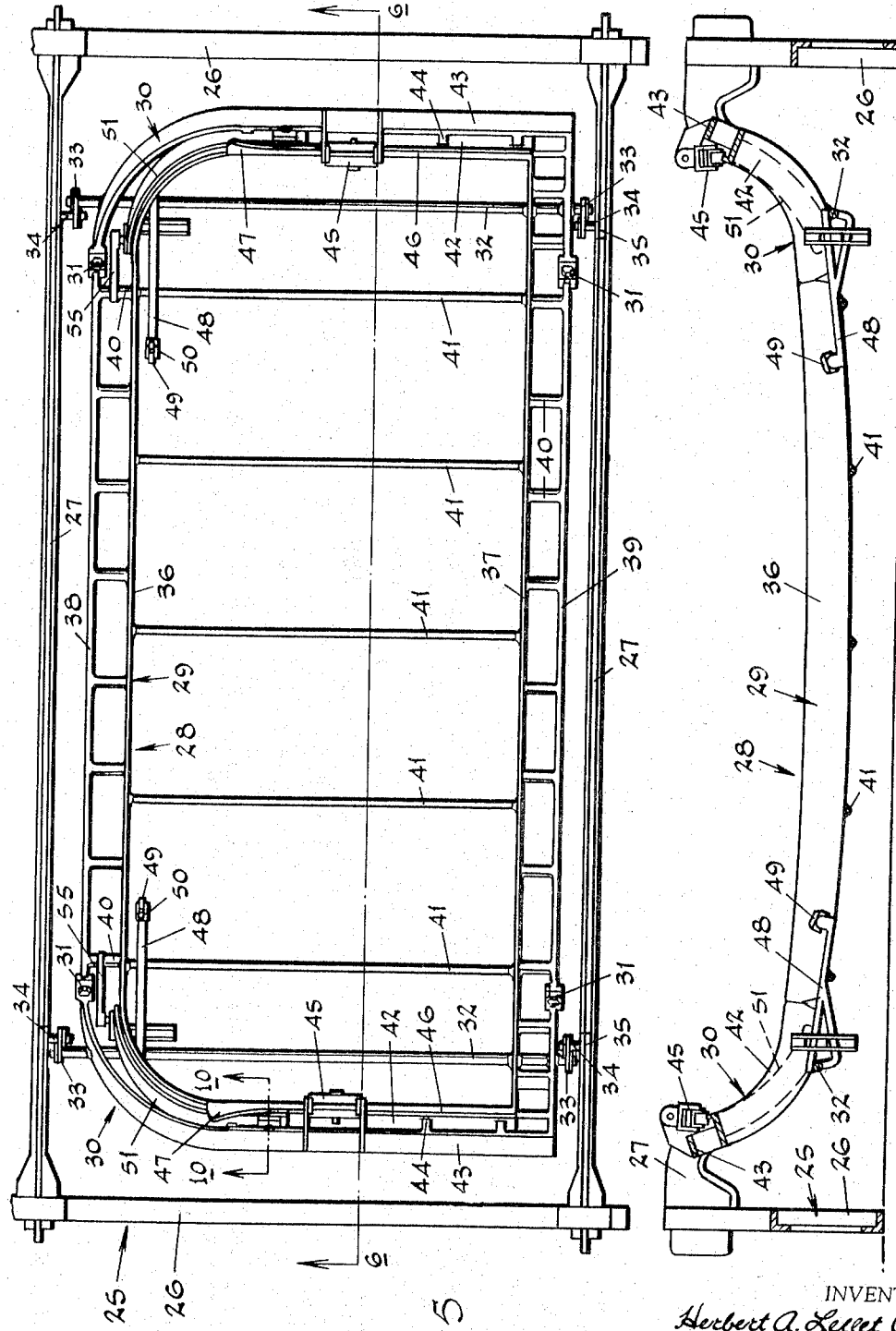

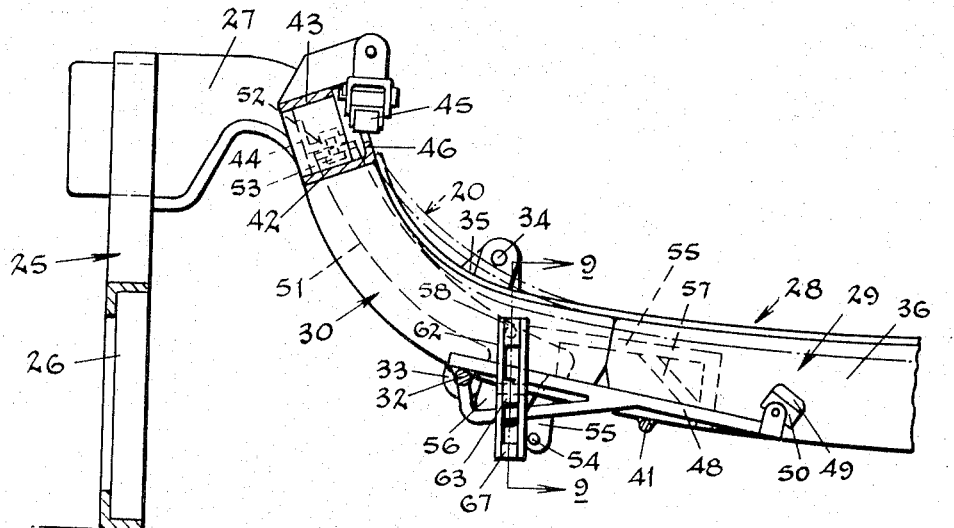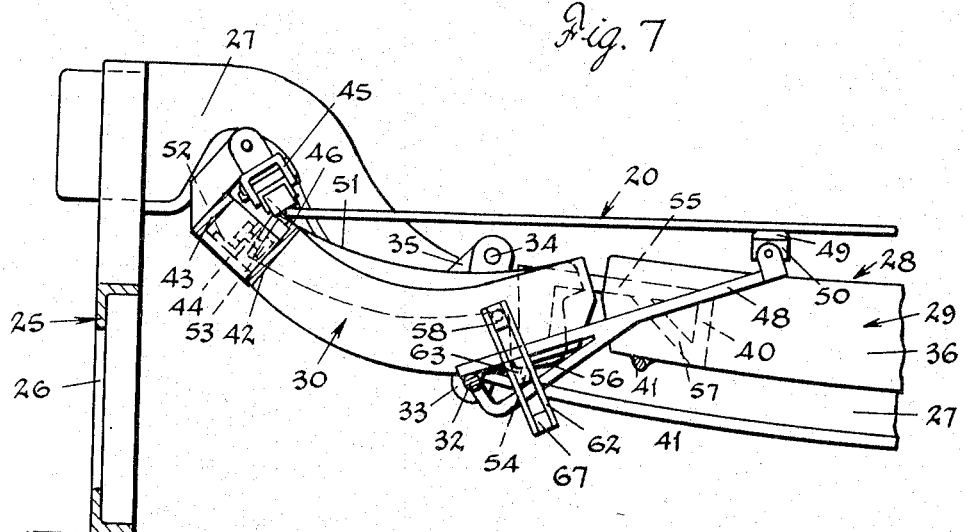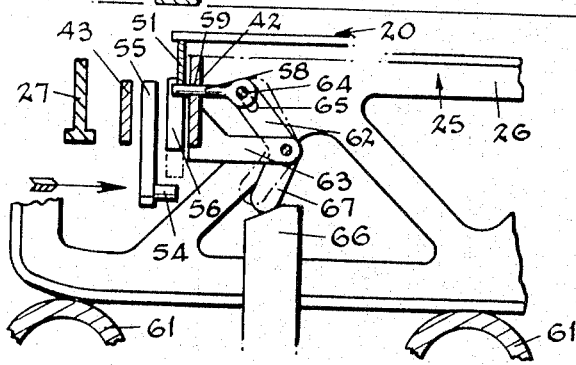

INVENTORS
Herbert A. Leflet, Jr. and
Frank J. Carlson

Nobbe & Swope
ATTORNEYS

United States Patent Office 3,364,005
Patented Jan. 16, 1968

3,364,005
APPARATUS FOR BENDING GLASS SHEETS
Herbert A. Leflet, Jr., and Frank J. Carson, Toledo, Ohio, assignors to Libbey-Owens-Ford Glass Company, Toledo, Ohio, a corporation of Ohio
Filed June 25, 1958, Ser. No. 744,479
3 Claims. (Cl. 65—290)

This invention relates broadly to a curved or bent sheet of glass or the like and to the method and apparatus for forming the same to a desired configuration. More particularly, it relates to a bent vehicle windshield or window which is curved about both the longitudinal and transverse axes thereof.

The modern present-day automobile not only utilizes windshields having a viewing area of greatly increased size but also this wide spread popularity for greater visibility from within the automobile has created a demand for increased glass area in other windows of the vehicle. This demand has necessitated increasing the viewing area or total glass surface of not only the automobile windshield but also the rear window to such an extent that it is becoming increasingly difficult to minimize light distortion in these windows, especially in regions of sharp curvature. This is especially true when the rear window extends upwardly from a curved trunk line of the automobile to a curved roof panel of the automobile and, in addition, is curved at the oppositely disposed end portions in a plane which is angularly disposed to the longitudinal axis of the vehicle. Such a construction involves a bend about both major axes of the glass sheets used to form the lights, including the usual longitudinal bend about the transverse axis which is necessary to form the oppositely disposed sharply curved portions and a bend about the longitudinal axis which produces what is commonly termed "over bend" to give the sheet an outwardly dished appearance.

In the past, the bending of glass sheets to a so-called panoramic shape comprising a bend primarily about the transverse axis has been difficult, and this difficulty has increased considerably with the addition of the outwardly curved portions at both the central areas of the sheet and in the regions of sharp curvature because of optical distortion; especially in these regions of sharp curvature. The causes of this distortion has been attributed to what is commonly referred to in the art as lateral bending which may be described as an indentation or crease within the regions of sharp curvature wherein the oppositely disposed end portions are joined to the central portion. This lateral bending may be more clearly described if, when thinking of the sheet as being bent about the lateral axis to form a convexly curved surface on the outwardly facing side and a concavely curved surface on the inwardly facing side, the term lateral bend is used to identify a depression formed in the convexly bent surface or a raised portion in the concavely bent surface. Moreover, this lateral bending is further distinguished from what is commonly called cross or over bending wherein the cross bend is outwardly from the convex surface of the sheet or a depression in the concave surface of the sheet. Thus, it is apparent that lateral bending is directly opposite to cross or over bending.

It has been found that in the compound curves of the glass sheets which are used in the windshields and rear windows of present day automobiles, it is desirable to have a certain amount of cross or over bending in order to maintain the streamlined shape of the vehicles. It is extremely undesirable to have lateral bending inasmuch as the lateral bending tends to destroy the smoothly contoured lines of the windshields or windows by giving them a "caved-in" appearance.

Lateral bending is caused by several factors, one of these which results from the use of multiple section molds is the effect of the lifting action of the mold end sections on the glass sheets as the mold moves from the open position to the closed position. When the mold is in the open position, the glass sheets are supported along marginal surface portions of their oppositely disposed extreme outermost end sections, and as the sheets soften due to the heat in the bending furnace, they lose their rigidity thereby permitting the mold sections to close. The oppositely disposed end sections of glass sheets are lifted by the mold end sections, and this lifting force is applied to the glass sheets at the marginal surface portions which are supported by the mold end sections. As a result of this unequal application of the lifting force, the extreme outermost marginal surface portions of the sheets are lifted above the unsupported portions and the supported portions of the sheets lead the unsupported portions during the closing of the mold. This, in turn, causes the unsupported portions to sag laterally from the ends of the supported portions instead of sagging uniformly along the entire width of the sheet, and a lateral bend develops because the central portions of the region of sharp curvature cannot sag properly due to this improper bending of the unsupported portions of the sheet.

This tendency towards lateral bending is further increased in molds where extreme bends occur because as the mold closes, the centrally disposed portions of the flat glass sheet must move a great distance to sag into contact with the mold center section. This, in turn, has a tendency to pull or draw the end portions of the sheet which, in turn, decreases the effective downward action of gravity upon these portions.

Another important cause of lateral bending during the later portions of the bending cycle is the factor of lateral contraction which is analogous to Poisson's ratio of lateral unit deformation to linear unit deformation within the elastic limit. More particularly, it has been established that the lateral unit deformation is proportional to linear elongation or shortening and when applied to glass sheets it has been observed that as the sheet is elongated in one direction it tends to shorten in the direction which is at right angles to the elongation. Also the converse is true that when the sheet is placed in compression, the dimension normal to the compressive force increases.

Applying this factor of lateral deformation to the bending of glass sheets on concave molds it has been found that as the sheet is bent, the convex surface on the outwardly facing side is in tension while the concave surface on the inwardly facing side is in compression. The phenomenon of lateral contraction as stated above then becomes apparent in that the dimension of the sheet which is at right angles to the bend or parallel to the axis of curvature of the curved portion tends to decrease on the convex side on the outwardly facing surface of the sheet because this surface is in tension. However, this dimension tends to increase on the concave side on the inwardly facing surface of the sheet because it is in compression. This, in turn, tends to curl the marginal edge portions of the sheet downwardly or toward the convex sheet surface to produce a lateral bending in the centrally disposed portions of the sheets if the curled outermost marginal portions are unsupported by the mold shaping rails.

A still further contributing factor to lateral bending is the fact that the regions of sharp curvature cannot be heated fast enough in comparison with the rest of the glass sheet to permit these sections to sag downwardly to form an unbent area. Thus, it is evident that all these factors contribute to lateral bending when the sheet must sag a substantial distance before it contacts the mold shaping surface.

Therefore, an important object of the present invention is to provide an improved vehicle windshield or window which provides a wide angle viewing area and a substantially outwardly curved configuration along the length thereof.

Another object of the invention is to provide a vehicle window having curved portions about both major axes which intersect in regions of sharp curvature with substantially outwardly curved portions in these regions of sharp curvature.

Another object of the invention is to provide an improved method and apparatus for bending glass sheets to complexly curved configurations.

A further object of the invention is to provide an improved method and apparatus for bending glass sheets wherein portions of the glass sheets are supported on a first shaping surface during the initial portion of the bending cycle and a second shaping surface during the later portion of the bending cycle.

A still further object of the invention is to provide an improved bending mold having auxiliary forming or shaping rails for supporting the glass sheets in regions of sharp curvature to prevent lateral bending.

Other objects and advantages of the invention will become more apparent during the course of the following description when taken in connection with the accompanying drawings.

In the drawings, wherein like numerals are employed to designate like parts throughout the same:

FIG. 5 is a plan view of a hinge type bending mold of the type described and showing the auxiliary forming rail associated with the end sections thereof in accordance with this invention when the mold is in the closed position;

FIG. 6 is a sectional view of the bending mold of FIG. 5 taken substantially along the section line 6—6 and showing the auxiliary forming rail associated therewith when the mold is in the closed position;

FIG. 7 is an enlarged sectional view of one end of the bending mold in the closed position;

FIG. 8 is an enlarged sectional view of one end of the bending mold in the open position;

FIG. 9 is a sectional view taken along the section line 9—9 of FIG. 7;

Briefly stated, the present invention, in addition to providing an improved automobile windshield or window, provides an improved method and apparatus for bending glass sheets about both the longitudinal and transverse axes thereof, wherein the flat glass sheets to be bent are first supported in a substantially horizontal plane above the shaping surface of a concave mold. While the method and apparatus described herein are for producing a rear window or light for an automotive vehicle, it is to be understood that the invention may be utilized in the manufacture of other automotive windows, such as windshields.

In bending the glass sheets, the mold and flat sheet or sheets supported thereon are passed through a suitable bending furnace by means of a suitable conveyor and the glass sheets are heated to bending temperature wherein the rigidity of the sheet or sheets is reduced thereby permitting the mold to close. The sheets then sag into contact with the mold shaping surface and are supported thereby along substantially the entire peripheral marginal surface portion of the underside of the glass sheets when the regions of sharp curvature are bent to an intermediate radius. An auxiliary shaping rail section in the region of sharp curvature is then moved out of contact with the adjacent marginal surface portion of the glass sheets and the glass sheets are bent to the final configuration in contact with the mold shaping surface.

Figure 1:
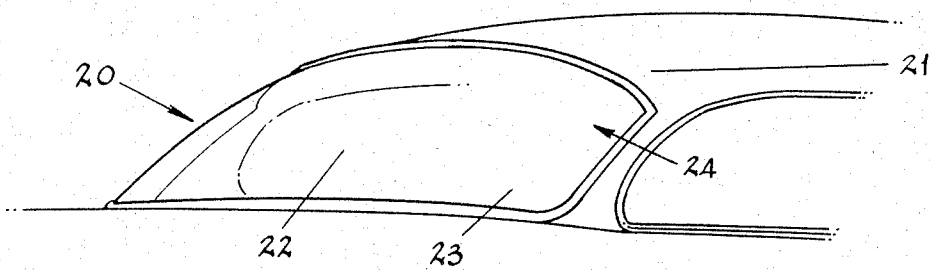
FIG. 1 shows a glass sheet bent in accordance with this invention and mounted in an automobile.
Figure 2:
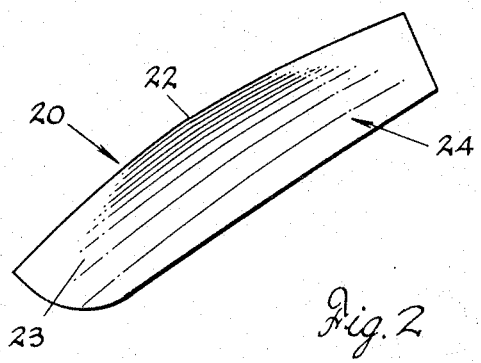
FIG. 2 is a side elevation of the bent glass sheet shown in FIG. 1.

With reference now to the drawings, and particularly to FIG. 1, there is shown a glass sheet 20 bent in accordance with the method and apparatus of the invention to produce a curved window or rear light that is installed in the automobile 21. As shown in FIGS. 1 to 4, the window is of a general panoramic type which is bent about both the longitudinal and the transverse axes of the glass sheet 20.

Figure 3:
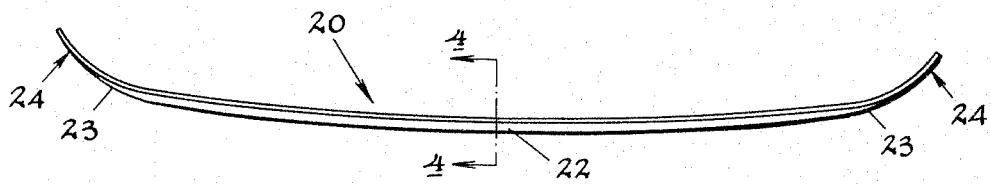
FIG. 3 is a top view of the bent glass sheet of FIG. 1.
Figure 4:
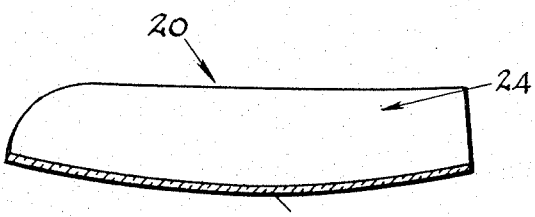
FIG. 4 is a sectional view of a bent glass sheet taken along the section line 4—4 of FIG. 3.

As shown in FIG. 3, the glass sheet 20 is bent symmetrically about the transverse axis rather gently in the relatively shallow central sheet portion 22 which merges adjacent the longitudinal extremities thereof into regions of relatively sharp curvature 23 to form oppositely disposed wing sections 24 in angularly spaced planes. The wing sections 24 have symmetrical extremities located outwardly from the regions of sharp curvature 23. Referring now to FIG. 4, it is apparent that the glass sheet 20 is bent about the longitudinal axis to form substantially outwardly curved or overbent portions in the central portion 22 and, as seen in FIGS. 1 to 4, these substantially outwardly curved portions extend into the regions of sharp curvature 23 adjacent the wing sections 24.

With reference now to FIGS. 5 and 6, the numeral 25 designates in its entirety a substantially rectangular mold support frame. This frame comprises a pair of upwardly extending end members 26 which are connected to one another at their uppermost ends by a pair of longitudinally extending concavely curved U-shaped mold supports 27.

The skeleton type mold proper is generally designated by the numeral 28 and comprises a plurality of cooperatively connected molded sections including a center section 29 and a pair of oppositely disposed aligned end sections 30. The center section 29 is movably connected to each of the oppositely disposed end sections 30 by means of hinges 31 and in the closed position of FIG. 6 there is formed a substantially continuous shaping surface conforming in elevation and plan outline to the shape or contour desired for the bent glass sheets.

To support the mold for movement from the open position of FIG. 8 wherein the glass sheets to be bent are received thereon to the closed position of FIG. 7, a transversely extending pivot bar 32 is secured to each of the mold end sections 30 and the oppositely disposed ends of the pivot bar 32 are rotatably supported by links 33. Pins 34 secured to generally upwardly extending members 35 rigidly secured to mold support 27 pivotally carry the downwardly depending links 33. The pivot bar 32 is normally adjusted so that the mold will close due to the weight of the center section 29 unless a force is applied to the outermost ends of the oppositely disposed end sections 30 which rotates the end sections about the pivot bars 32 to raise the hingedly connected center section 29.

The center section 29 includes a pair of spaced concavely curved shaping rails 36 and 37 which rise from the center in an arc that terminates at the pivot point of each hinge 31. Mating support rails 38 and 39 are joined to the forming rails 36 and 37 by means of separator blocks 40, and the top surface of each of the support rails 38 and 39 are substantially parallel to the top or shaping surface of each of the forming rails 36 and 37 respectively, but each support rail surface is substantially below the corresponding shaping rail shaping surface. Tie rods 41 span the space between the shaping rails 36 and 37 and are secured to the underside thereof thus rigidly maintaining the relative positions of these forming rails.

Each end section 30 comprises a substantially U-shaped shaping rail 42 and a mating support rail 43. The shaping rail 42 is carried by the mating support rail 43 and the top surface of each rail substantially parallels the top surface of the other. However, the top surface of the shaping rail 42 is above the top surface of the support rail 43. Further, the end shaping rail 42 and the support rail 43 are joned by blocks 44 spanning the space therebetween. The undersides of both the forming rails 42 and the support rails 43 are secured to and carried by the transversely extending pivot bars 32 and as stated earlier, the support rails 43 are movably connected to the support rails 38 and 39 by means of the hinges 31.

At the center of the extreme outermost end portion of each substantially U-shaped end support rail 43 there is located a universally movable stop 45 which is disclosed in U.S. Patent 2,814,164 to F. J. Carson et al. for properly locating the glass sheet 20 above the mold 28 when flat and for additionally exerting pressure on the ends of said glass sheet while maintaining the same in proper relation to said mold during the bending thereof. It is to be understood that the disclosed stop 45 forms no part of the present invention, and our invention will operate equally well with stops which do not exert pressure on the ends of the sheets and merely serve to locate the sheet.

In order to support the extreme outermost portions of the glass sheet 20 and to transmit the lifting force of the end sections 30 to the sheets, support surfaces or fairings 46 are secured to the extreme outermost portions of the end section forming rails 42 as shown in FIGS. 5 and 8. As stated earlier, the supported portions of the sheet 20 which contact the fairing 46 lead the unsupported portions adjacent the end of the fairing during the closing of the mold 28. In order to prevent the sheet 20 from being marked by the edge of the fairing as the supported portion of the sheet is lifted as the mold closes, the fairing is somewhat flared and curved downwardly at the end 47 as shown in FIG. 5.

Inasmuch as the mold is used to bend the end portions 24 of the glass sheet 20 substantially out of the plane of the central portion 22 the shaping rail 36 is lower than the forming rail 37 when the mold is in the closed position, the shaping surface of the forming rail 36 does not raise sufficiently when the mold is moved to the open position to support the glass sheet 20 in a substantially horizontal plane. Consequently, as shown most clearly in FIGS. 7 and 8, arms 48 are secured to the pivot bars 32 adjacent the inner surface of the end section shaping rail 42 at the portion thereof adjacent to the center section forming rail 36 which is below the support plane of the glass sheet when the mold is in the open position. Support blocks 49 of Marinite (registered trademark) or other suitable material which will not fuse with the glass at the bending temperature thereof, are disposed at the free inner ends of said arms for contacting the underside of the flat glass sheets 20 and are pivotally carried by the arms 48 by means of a suitable U-shaped bracket 50.

It will be understood that upon moving the mold 28 to the open position, the arms 48 will move with the end sections 30 of the mold from the lower position of FIG. 7 to the elevated position of FIG. 8. Thus, in order that the support blocks 49 of the arms 48 be disposed in proper position to support the flat glass sheet 20 at a level where the glass sheets 20 contact both the fairings 46 and the block 49 at the beginning of the bending cycle, said arms are secured to the pivot bars 32 at predetermined points and at a predetermined angular disposition to the end section shaping rails 42.

According to the present invention, an auxiliary shaping rail 51 having a contoured sheet engaging surface for supporting the glass sheet 20 in the region of sharp curvature when the sheet is bent to an intermediate curvature is carried by each end section 30 outwardly of but in close proximity to the generally curved portion of the shaping rail 42 which lies adjacent the lower center section shaping rail 36. The auxiliary shaping rail 51 is formed to a configuration which is substantially geometrically similar in plan to the shaping rail 42 and is mounted for movement from a position wherein the sheet engaging surface is below the shaping surface of the rail 42 when the mold is in the closed position to a position wherein the sheet engaging surface of the auxiliary rail 51 is above the mold shaping surface in the open position.

Figure 10:
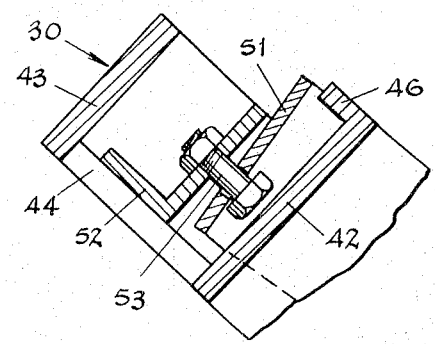
FIG. 10 is a sectional view taken along the section line 10—10 of FIG. 5.

More particularly, the auxiliary shaping rail 51 is pivotally secured at the outermost end to the mold end section 30 by means of an angle member 52 rigidly secured to a separator block 44 which has been suitably machined to from a substantially rigid support member extending between the support rail 43 and the shaping rail 42. The rail 51 is adapted to receive a suitable pivot pin 53 which extends through suitable apertures in both the angle member 52 and the uppermost portion of the auxiliary shaping rail 51 as shown in FIG. 10. The auxiliary shaping rail 51 is free to pivot about the pin 53 to an upper or first position when the mold is in the open position wherein the upwardly facing contoured surface thereof extends above the upwardly facing shaping surface of the adjacent portions of the end section forming rail 42 as most clearly seen in FIG. 8. Downward pivotal movement of the auxiliary shaping rail 51 is limited by the lug portion 54 of a lifting member 55 which engages a downwardly extending leg portion 56 of the rail 51.

As shown in FIG. 9, the pivotally mounted auxiliary shaping rail 51 is lifted to its uppermost position above the mold shaping surface by means of the L-shaped lifting member 55 which extends outwardly from the center section 29 and is rigidly mounted on the separator block 40 by a suitable brace member 57. As the mold is moved from the closed position of FIG. 7 to the open position of FIG. 8, each end section 30 rotates on the pivot bar 32 and the center section 29 moves upward carrying the lifting member 55. The lug portion 54 which engages the underside of the auxiliary shaping rail 51 lifts the rail from the lowermost or second position shown by the dotted line in FIG. 9 to the uppermost position shown by the solid lines. The auxiliary shaping rail 51 is retained in its uppermost position by a movable rod or locking member 58 which extends through an opening 59 formed in the end section forming rail 42 and engages the underside of the auxiliary shaping rail 51 adjacent the leg portion 56 when the lifting member 55 has raised the auxiliary shaping rail to its uppermost position.

As stated earlier, the glass sheet 20 and the bending mold 28 are moved through a bending furnace 60 by means of power driven rollers 61 of a roller conveyor and as the glass sheet is heated to bending temperature, it softens and loses its rigidity which permits the mold to close under the influence of gravity and the glass sheet to sag into conformity with the shaping surface of the mold forming rails. After the sheet has contacted the shaping surface of the auxiliary shaping rail 51 and at an appropriate point in the bending cycle, the auxiliary shaping rail 51 is released and permitted to drop below the end section forming rail 42.

The release of the auxiliary shaping rail 51 is accomplished by a pair of retracting members in the form of substantially L-shaped links 62 which are both pivotally mounted on a support plate 63 secured to the inner surface of the end section shaping rail 42. The rod 58 is positioned between the uppermost ends of the links 62 and is operably connected thereto by a pin 64 which extends through an elongated opening 65 formed in both the links 62 and an eye in the end of the rod 58.

Figure 11:
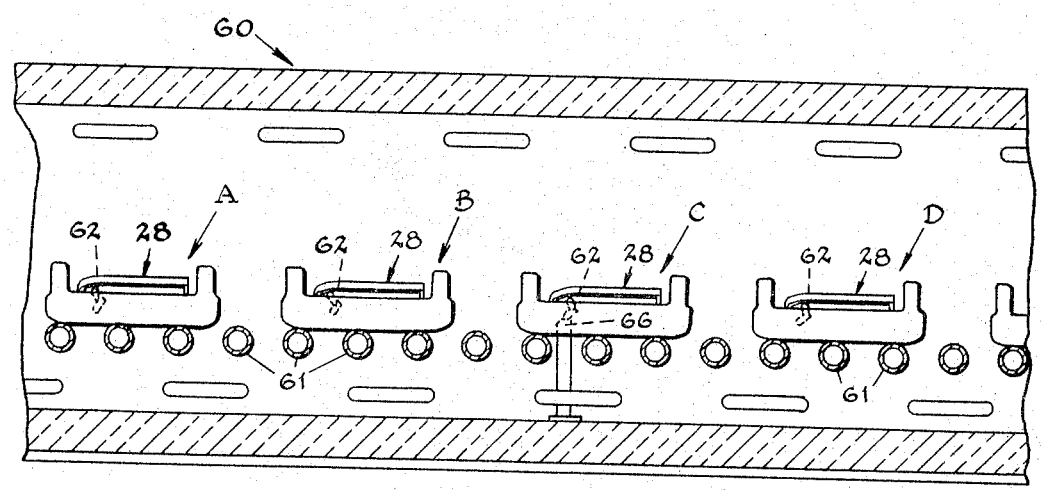
FIG. 11 is a sectional view of a bending furnace showing the installation of the actuating member used to release the pivotally mounted auxiliary shaping rail which forms a part of the mold of the present invention.

As seen in FIGS. 9 and 11 an upwardly extending actuating member 66 is suitably located within the bending furnace 60 and is adapted to smoothly engage the downwardly extending portion of the spaced links 62 along its uppermost bevelled surface. This moves the links from the locking position shown by the solid lines in FIG. 9 to the release position shown in the dotted line. The resulting rotation of the links 62 causes the rod 58 to move longitudinally in the opening 59 and be withdrawn from engagement with the underside of the auxiliary shaping rail 51 which, in turn, permits the rail 51 to fall under the influence of gravity to its lowermost position.

A weighted member 67 secured between the lowermost portion of the links 62 ensures a greater mass in the lower portion than the upper portion; consequently the links will tend to return to the position shown by the solid lines of FIG. 9. However, when the auxiliary shaping rail 51 is in its lowermost position, the end of the rod 58 opposite the eye portion abuts against the inner surface of the rail 51 and the links 62 are prevented from returning to the normal position.

In operation when the mold 28 is moved to the open position of FIG. 8 the lifting member 55 raises the auxiliary shaping rail 51 to the upper position wherein the underside of the rail 51 is positioned above the rod 58. This permits the links 62 to rotate to the normal position shown by the solid lines in FIG. 9 wherein the rod 58 protrudes from the opening 59 in the rail 42 to retain the rail 51. As the mold moves to the closed position of FIG. 7 as it proceeds through the furnace 60, the lifting member 55 is lowered with the center section 29 thereby permitting the auxiliary rail 51 to drop into engagement with the lug 54 when the rod 58 is moved longitudinally in the opening 59.

According to the method of the present invention, the mold 28 is moved into the open position as shown in FIG. 8 and the glass sheet 20 is supported thereon in bending relationship with the shaping surface of the shaping rails by means of the fairing 46 and the arms 48. As the mold is moved to the open position, the lug 54 of the lifting member 55 contacting the underside of the auxiliary shaping rail moves the rail 51 to its uppermost position and this rail is maintained in this position by the slidably mounted rod 58 which shifts under the action of the actuating member 62. Power driven rolls 61 move the frame 25 and the mold 28 supporting the glass sheet 20 into the bending furnace 60 wherein the glass is heated to a bending temperature at which it loses its rigidity. As the glass sheet softens, the mold end sections 30 rotate about the pivot bars 32 to a closed position as shown in FIG. 7 and A of FIG. 11 wherein the center section 29 is lowered thereby lowering the lifting member 55 secured thereto and the support arms 48 are moved below the mold shaping surface.

As the mold moves from the open position of FIG. 8 to the closed position of FIG. 7, the unsupported portion of the glass sheet 20 lying between the flared portions 47 of the fairing 46 and the support blocks 49 above the sharply curved portion of the forming rail 42 sags downwardly towards the mold due to the action of gravity on the softened sheet, the lifting action of the fairing 46 and the factor of lateral contraction as explained earlier. Before this unsupported area of the glass sheet 20 can bend a distance great enough to deform the sheet in the sharply curved portion 23 and cause lateral bending, that portion of the sheet 20 contacts the contoured sheet engaging surface of the auxiliary shaping rail 51 which has been raised above the shaping surface of the end forming rail 42 by the lifting member 55. The glass sheet 20 bends into conformity with the remaining portions of the shaping surfaces of the mold shaping rails and is supported in the regions of sharp curvature 23 by the auxiliary shaping rail 51. During this support and while moving further through the furnace 60 as at B in FIG. 11, the regions of sharp curvature are heated sufficiently to cause the sheet to sag downwardly in the centrally disposed portions to cause appreciable cross or overbending.

In order to complete the bend in the regions of sharp curvature, the auxiliary shaping rail is dropped from under the glass sheet 20 in the regions of sharp curvature by the upwardly extending actuating member 66 as shown in FIG. 9 which engages the links 62 to withdraw the rod 58 from beneath the auxiliary forming rail 51 as the mold passes a predetermined point within the furnace as at C in FIG. 11. Thereupon, the glass sheet 20 is heated further as at D in FIG. 11 and permitted to sag into contact with the remaining portions of the shaping surface of the end section shaping rails 42. After the sheet 20 has been bent to the final configuration determined by the shaping surface of the mold 28, the sheet and mold are moved out of the bending furnace by means of the rollers 61 and passed through a tempering area whereupon the glass sheet 20 is properly cooled for removal from the mold 28.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:

1. A skeleton type mold for supporting glass sheets during bending, comprising a center section and end sections pivotally connected to the center section, each of said sections being provided with shaping rail portions, means for supporting the mold sections so that they are movable to an open position to receive glass sheets to be bent and to a closed position in which said shaping rail portions are aligned to provide a substantially continuous shaping surface conforming in elevation and plan outline to the shape desired for the bent glass sheets, an auxiliary shaping rail operable to support said glass sheets during movement of said mold sections from said open to said closed position and being substantially geometrically similar in plan to the shaping rail portion of one of said end sections and curved in elevation similarly to said shaping rail portion of said one end section but having a radius of curvature in elevation intermediate that of an essentially straight line and that of the shaping rail portion of said one end section, said auxiliary shaping rail being carried by at least one of said end sections and mounted adjacent the outer end thereof for pivotal movement outwardly of but in close proximity to the shaping rail portion of said one end section from a first position above said shaping rail portion of said one end section to a second position beneath said shaping rail portion of said one end section, a lifting member secured to said center section and extending outwardly therefrom, said lifting member having a lug portion for engaging the undersurface of said auxiliary shaping rail and lifting same into said first position during movement of said mold sections into the open position, and locking means for engaging the undersurface of said auxiliary shaping rail after it has been lifted to said first position and for retaining said auxiliary rail in said first position.

2. An apparatus in accordance with claim 1, in which release means are provided which cooperate with said locking means to disengage same from said undersurface of said auxiliary shaping rail at a predetermined point in the bending operation.

3. An apparatus in accordance with claim 2, in combination with a bending furnace, a conveyor for moving said mold along a path through said bending furnace, and actuating means mounted within said furnace and along said path for actuating said release means and causing said lifting member to operate to move said auxiliary rail from its said first position to said second position.

References Cited

UNITED STATES PATENTS

| | | | |
|---|---|---|---|
| 1,944,160 | 1/1934 | Barker | 296—84 |
| 2,551,606 | 5/1951 | Jendrisak | 65—107 |
| 2,608,030 | 8/1952 | Jendrisak | 65—287 |
| 2,737,758 | 3/1956 | Jendrisak | 65—290 |
| 2,761,248 | 9/1956 | Cowley et al. | 65—152 |
| 2,761,249 | 9/1956 | Olson et al. | 65—152 |
| 2,774,189 | 12/1956 | Jendrisak | 65—290 |
| 2,817,559 | 12/1957 | Nickles | 296—84 |
| 2,817,928 | 12/1957 | Lambert et al. | 65—106 |
| 2,869,287 | 1/1959 | Bamford | 65—104 |
| 2,893,170 | 7/1959 | Carson et al. | 65—107 |
| 2,957,277 | 10/1960 | White et al. | 65—273 |
| 3,281,231 | 10/1966 | McKelvey et al. | 65—288 |

FOREIGN PATENTS 558,473    3/1957    Italy.

DONALL H. SYLVESTER, *Primary Examiner.*

CHARLES R. HODGES, ARTHUR P. KENT, J. S. BAILEY, *Examiners.*

F. W. MIGA, *Assistant Examiner.*